Nov. 2, 1954
G. P. PETRON
2,693,368
ADJUSTABLE DRAFT TONGUE
Filed April 23, 1951
2 Sheets-Sheet 1
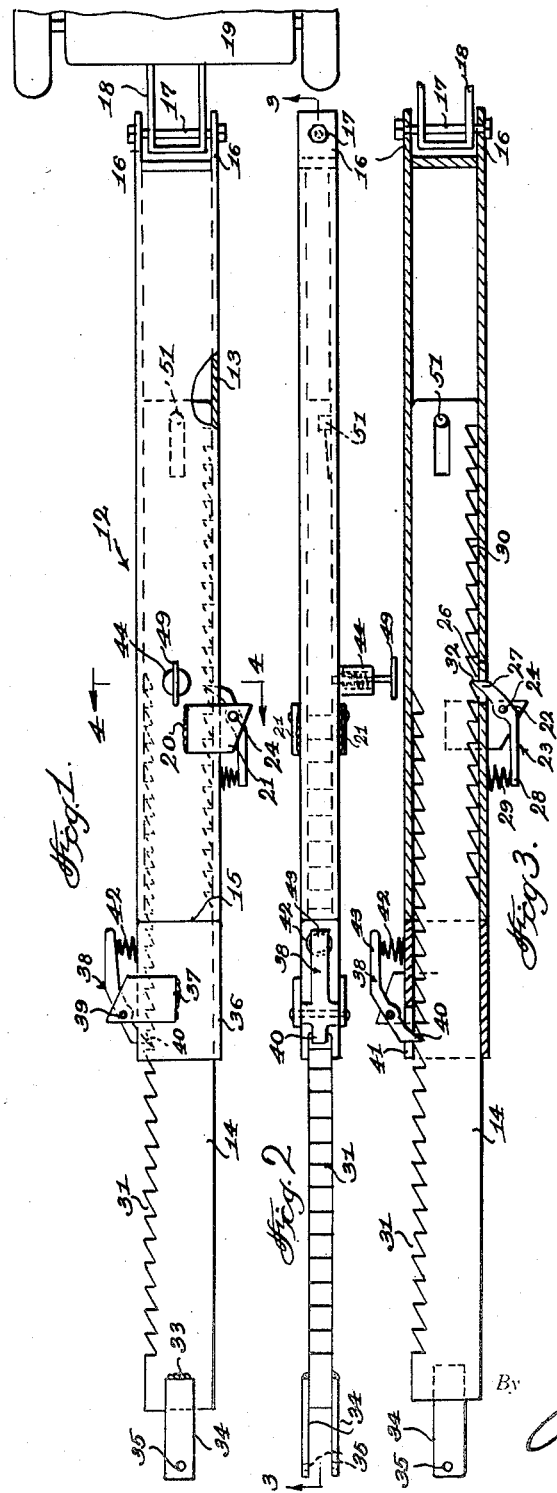
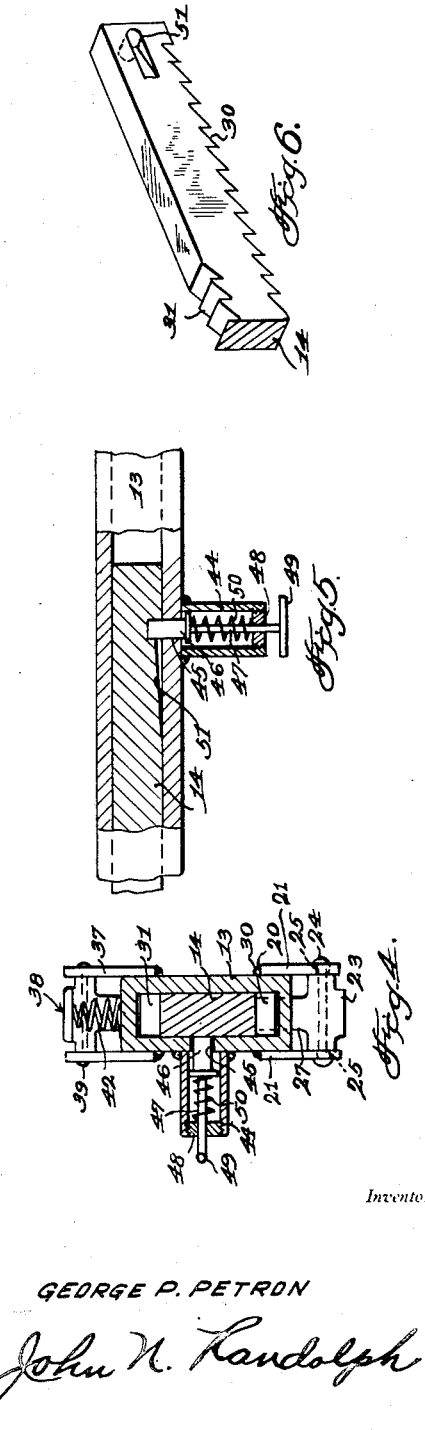
Inventor
GEORGE P. PETRON
By John N. Randolph
Attorney

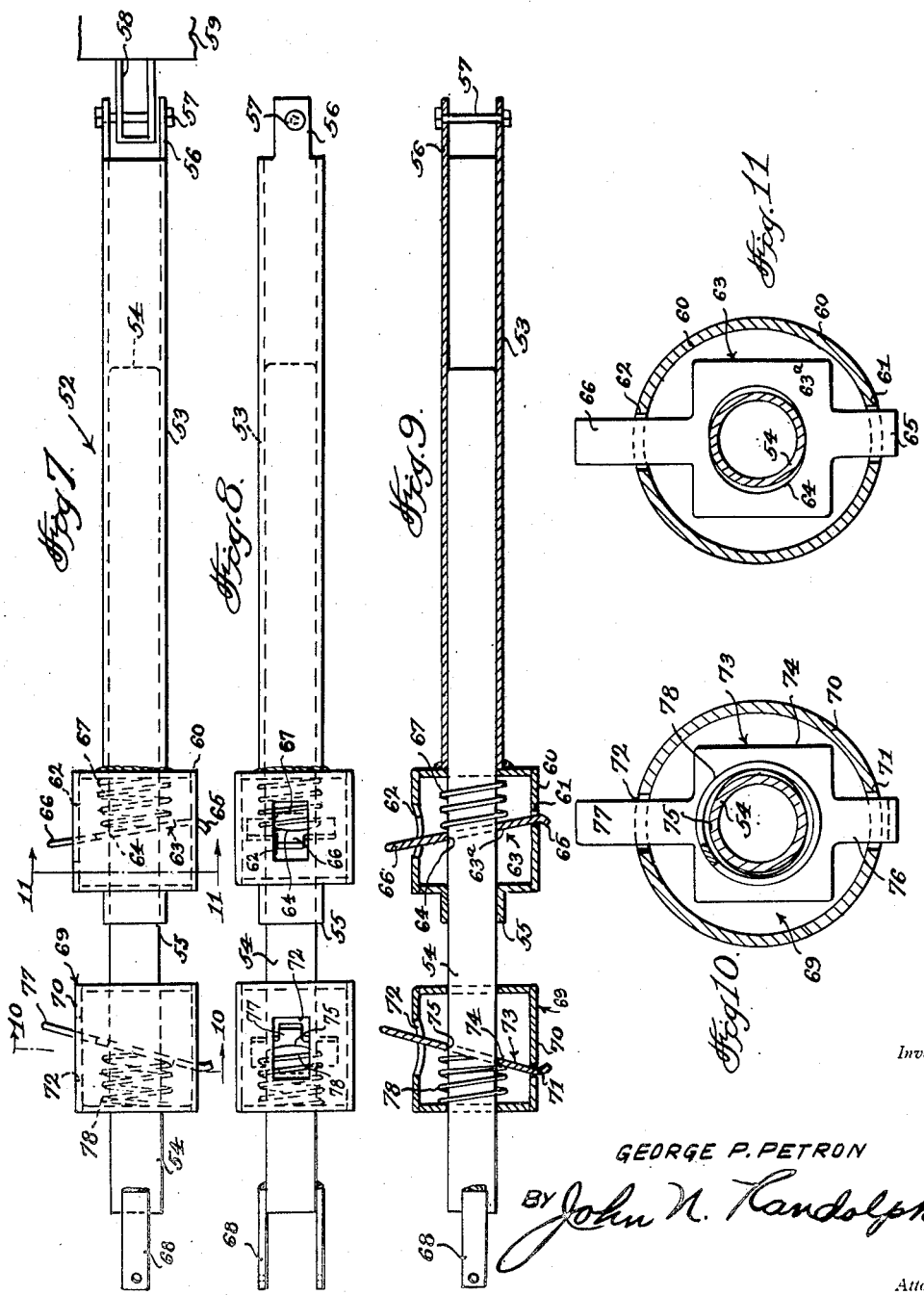

United States Patent Office 2,693,368
Patented Nov. 2, 1954

2,693,368

ADJUSTABLE DRAFT TONGUE

George P. Petron, Long Prairie, Minn.

Application April 23, 1951, Serial No. 222,355

5 Claims. (Cl. 280—482)

This invention relates to a novel construction of draft tongue for connecting a draft vehicle and trailer vehicle and which is capable of being readily extended or retracted to enable the draft tongue to be connected to a draft vehicle and trailer vehicle spaced different distances apart, thereby eliminating the need of backing the draft vehicle or pulling the trailer vehicle forward so that the distance between the vehicles will correspond to the length of the tongue to enable the coupling pins to be applied.

Still a further object of the invention is to provide a draft tongue which may be adjusted to operate at different lengths so that after extending the tongue to accomplish the coupling thereof the draft vehicle may be backed for retracting the tongue to a desired length and in which the tongue will be rigidly maintained, thereby enabling the use of either a short or long draft tongue, as desired by the draft vehicle operator.

Various other objects and advantages of the invention will hereinafter become more fully apparent from the following description of the drawings, illustrating presently preferred embodiments thereof, and wherein:

Figure 1 is a plan view of one form of the invention;

Figure 2 is an edge elevational view thereof looking from top to bottom of Figure 1;

Figure 3 is a longitudinal sectional view taken substantially along a plane as indicated by the line 3—3 of Figure 2;

Figure 4 is a cross sectional view taken substantially along a plane as indicated by the line 4—4 of Figure 1;

Figure 5 is a fragmentary longitudinal sectional view partly in edge elevation showing a safety latch means in an engaged position;

Figure 6 is a fragmentary perspective view of a portion of one element of the draft tongue;

Figure 7 is a plan view similar to Figure 1 of another form of the invention;

Figure 8 is an elevational view of the same looking from top to bottom of Figure 7;

Figure 9 is a longitudinal sectional view partly in side elevation thereof;

Figure 10 is a cross sectional view taken substantially along a plane as indicated by the line 10—10 of Figure 7, and Figure 11 is a cross sectional view taken substantially along a plane as indicated by the line 11—11 of Figure 7.

Referring more specifically to the drawings, and first with reference to the form of the invention as illustrated in Figures 1 to 6, the draft tongue, designated generally 12 and comprising the invention, is formed of telescoping sections including a female sleeve section 13 and a male, bar section 14 which slidably fits and telescopically engages in the female section 13 and which projects from the outer, open end 15 of said section 13. The opposite, inner end of the female section 13 which may be closed, is provided with bar extensions 16 which project from the side edges thereof to form a clevis and which bars are apertured to receive a coupling pin 17. The clevis bars 16 are adapted to straddle a forwardly projecting coupling member 18 of a trailer vehicle, a portion of which is shown at 19 and the coupling pin 17 extends through said forwardly projecting coupling member 18 for pivotally coupling the draft tongue 12 thereto about a horizontal axis so that the draft tongue can swing vertically on the coupling pin 17. Accordingly, the clevis 16 constitutes a horizontally disposed clevis.

As best illustrated in Figure 4, the sections 13 and 14 are of rectangular cross section and the top and bottom portions thereof are preferably substantially wider than their side edges. A pair of corresponding plates are secured to the top and bottom surfaces of the sleeve section 13 adjacent its open end 15 in any suitable manner as by welding, as seen at 20 and said plates have portions which project outwardly from one side edge of the section 13, which portions of the plates 21 form a bracket between which the intermediate portion 22 of a latching dog or pawl 23 is disposed. A pivot pin 24 extends through the intermediate portion 22 of the pawl 23 and the ends of said pivot pin 24 extend through and are journaled in aligned openings 25 of the bracket plates 21. The adjacent edge wall of the sleeve section 13 is provided with an opening 26 through which one end 27 of the dog or pawl 23 extends. The opposite, longer end 28 of the pawl 23 is disposed outwardly of and substantially parallel to said side wall of the sleeve 13 and an expansion spring 29 is disposed between the pawl end 28 and said adjacent wall of the sleeve 13 and is preferably secured at its ends to said parts for causing the pawl 23 to rock counterclockwise on its pivot 24 for urging the pawl end 27 inwardly through the slot 26.

The bar section 14 which is sized to fit relatively snug in the sleeve section 13 but with sufficient clearance to permit free sliding movement, is provided along one side edge thereof with a series of corresponding teeth 30 which are cut into said side edge, all of which face toward the open end 15 of the sleeve section 13 and each of which includes a shoulder disposed transversely of the bar 14 and an inclined side which extends from the inner end of the shoulder toward the open end 15 of the sleeve. The teeth 30 are preferably formed in only the end of the bar 14 which is disposed within the sleeve 13 but may extend from end-to-end of said bar. The opposite side edge of the bar 14 is provided with a series of teeth 31 corresponding to the teeth 30 but which face in the opposite direction and which extend from adjacent the opposite, outer end of the bar 14 toward its inner end. The adjacent ends of the series of teeth 30 and 31 preferably overlap, as best illustrated in Figure 3 and the teeth 31 likewise preferably do not extend to the inner end of the bar. It will be readily apparent that the spring 29 will normally hold the pawl end 27 in engagement between two of the teeth 30 so that its outer side 32 will abut substantially flush against a transverse shoulder of one of the teeth 30 to retain the bar 14 against outward sliding movement relatively to the sleeve 13; however, the terminal of the pawl end 27 is adapted to ride over the inclined sides of the teeth 30 so that the bar 14 may be telescoped into the sleeve 13 and when so moved, the pawl end 27 will ride over the inclined faces of the teeth 30 and be cammed outwardly through the slot 26 against the action of the spring 29. Thus, the pawl 23 will latch the bar 14 against outward sliding movement relatively to the sleeve 13 but will permit the bar to slide inwardly thereof and will latch the bar in any position in which it is telescoped into the sleeve. However, the pawl end 28 may be displaced toward the sleeve 13 to swing the pawl end 27 out of engagement with the teeth 30 so that the bar 14 can be extended.

A pair of rigid strap members are secured to the top and bottom surfaces of the outer end of the bar 14 in any suitable manner as by welding, as seen at 33 and said strap members 34 project from the outer end of the bar 14 to form a vertical clevis, as distinguished from the horizontal clevis 16. The clevis 34 is adapted to straddle a drawbar or other coupling member, not shown, of a draft vehicle or tractor and the clevis elements 34 are provided with aligned openings 35 for receiving a coupling pin, not shown, which can correspond to the coupling pin 17 for coupling the clevis 34 to the draft vehicle. It is to be understood that the term "tractor" as used herein is intended to refer to any type of draft or pulling vehicle and the term "trailer" is intended to refer to any vehicle to be pulled.

A short sleeve member 36, hereinafter referred to as a "collar", of the same cross sectional size and shape as the sleeve section 13 is slidably mounted on the bar 14 between the clevis 34 and the sleeve end 15 and has a pair of bracket plates 37 secured to its top and bottom surfaces and corresponding to the bracket plates 21. The bracket plates 37 project in the opposite direction to the bracket plates 21 and straddle the intermediate portion of a pawl or dog 38, corresponding to the dog 23 and which is pivotally connected to the plates 37 by a pivot pin 39. The pawl end 40, corresponding to the pawl end 27, extends through a slot 41, corresponding to the slot 26, formed in the collar 36, and engages between two of the teeth 31, as best seen in Figure 3. A spring 42, corresponding to the spring 29, engages between the opposite ends of the pawl 38 and a portion of the collar 36 to urge the pawl end 40 into engagement with the teeth 31. The latching pawl or dog 38 normally latches the collar 36 against sliding movement outwardly of the bar 14 toward the clevis 34 but by pressing inwardly on the pawl end 43 to compress the spring 42, the pawl end 40 will be disengaged from the teeth 31 so that the collar 36 may be slid either toward or away from the clevis 34.

Assuming that the draft tongue 12 has been coupled to the trailer 19 by the coupling pin 17, as illustrated in Figures 1 and 3, a tractor, not shown, is backed up to adjacent the clevis 34 to be coupled thereto. However, it is very difficult to position the tractor at the exact distance from the trailer for ordinarily accomplishing the coupling and consequently with conventional rigid draft tongues either the tractor or trailer must be moved forward or backward until a correct distance is obtained between the two which frequently requires considerable time. However, with applicant's structure this objection is overcome as the pawl 38 can be disengaged from the teeth 31 and the collar 36 moved forwardly to adjacent the clevis 34 after which the pawl or latch dog 23 is disengaged, as previously described, so that the bar 14 may be telescoped into or extended relatively to the sleeve 13 to adjust the tongue 12 to a proper length so that the clevis 34 can be coupled to the tractor. When the dog 23 is then released it will prevent the tongue 12 from being further extended. However, if it is desired to shorten the tongue this can be readily accomplished by then backing the tractor until the collar 36 strikes the sleeve end 15. The tongue 12 will then be latched against movement in either direction in a retracted position as the pawl 38 retains the collar 36 against sliding movement toward the clevis 34 and by abutting the sleeve end 15 thus prevents the bar telescoping into said sleeve while the pawl 23 prevents the bar 14 from sliding outwardly of the sleeve. Likewise, the collar 36, which with the pawl 38 forms an adjustable stop, may be positioned at different distances from the clevis 34 so that the draft tongue will thus be latched against extension or retraction at any desired length when the collar 36 is abutting the sleeve end 15. The operator of the tractor need not immediately back the tractor to latch the tongue 12 in a desired adjusted length since the first time that the tractor is slowed or stopped the inertia of the trailer will cause the bar 14 to slide inwardly of the sleeve 13 until the sleeve end 15 abuts the collar 36, after which the tongue 12 will be retained in the desired adjusted length. By removing the clevis 34 and securing it to the opposite end of the bar 14 said bar may be reversed so that if one of the sets of teeth 30 or 31 becomes excessively worn the other set may be utilized in place thereof and where the excessive wear occurs.

The tongue 12 is preferably provided with a safety latch comprising a guide tube which is fixed to and projects from the top wall of the sleeve 13, near the bracket 21. Said guide sleeve 44 has its bore registering with an opening 45 of said sleeve wall in which a latch plunger 46 is reciprocably disposed. The latch plunger 46 has a stem 47 projecting from its outer end which extends outwardly through the tube 44 and slidably through a plug 48 which is threadedly secured in the outer end of the tube 44. The stem 47 has a handle 49 at its outer end, which is disposed beyond the plug 48 and by which the plunger 46 may be retracted outwardly of the sleeve 13. An expansion spring 50 is disposed in the tube 44 between the plug 48 and plunger 46 and is mounted on the stem 47 for urging the plunger 46 inwardly of the sleeve 13. The bar 14 is provided with a recess 51 in its upper side and adjacent its inner end to receive the spring projected plunger 46 when the bar 14 is moved to a fully extended position so that the tooth 30 located adjacent the inner end of the bar has passed beyond the pawl end 27. Thus, the latch plunger 46 provides a safety attachment to prevent the bar 14 from being disengaged from the sleeve 13 should the pawl 23 break or in the event that the pawl is held in a released position and the bar 14 extended outwardly too far. It will likewise be readily obvious that the safety latch can be mounted on the underside of the tongue 12, if desired, and may be manually retracted by means of the handle 49 to disengage the plunger 46 from the recess 51 for removal of the bar 14 from the sleeve 13.

Figures 7 to 11 illustrate another embodiment of the draft tongue, designated generally 52, having a female sleeve section 53 and a male bar or rod section 54 one end of which telescopes into the outer end 55 of the female section 53. The sections 53 and 54 are shown as being circular in cross section although said sections may obviously be of non-circular cross section and the section 54 is shown as being hollow although it may obviously be solid and the sleeve section 53 at its opposite, inner end is provided with a horizontal clevis 56, corresponding to the clevis 16 and which is connected by a coupling pin 57 to a coupling member 58 of a trailer 59, a portion of which is illustrated in Figure 7, so that the draft tongue 52 is likewise adapted to swing in a vertical plane. The sleeve section 53, adjacent its outer end 55, is provided with an enlarged portion 60 which may be either secured to or formed integral therewith and which is provided with an opening 61 and an elongated slot 62. The slot 62 is disposed opposite the opening 61 and extends longitudinally of the sleeve 53. A friction type latching dog, designated generally 63, includes a plate 63a which is loosely mounted in the enlargement 60 and which is provided with an opening 64 through which the tongue section 54 extends and through which said tongue section is capable of sliding in either direction when the plane of the plate 63a is at a right angle to the axis of the tongue section 54. The dog 63 includes a lug 65 which projects from one edge of the plate 63a and which extends loosely through the opening 61 and is preferably bent at an oblique angle adjacent its terminal and outwardly of the enlargement 60, as seen in Figure 9. A longer lever 66 projects from the opposite edge of the plate 63a in alignment with the lug 65 and extends loosely through the slot 62 and to a substantial distance outwardly of the enlargement 60. An expansion coiled spring 67 is mounted on the tongue section 64, within the enlargement 60 and between the plate 63a and the inner end of said enlargement so that the spring 67 urges the friction latch dog 63 toward the outer sleeve end 55. As the lug 65 fulcrums in the opening 61 the spring 67 will cause the dog 63 to rock about the opening 61 as a fulcrum counterclockwise as seen in Figure 9 so that the upper portion of the plate 63a and lever 66 will swing toward the sleeve end 55. The opening 64 is only sufficiently large to allow the tongue section 54 to slide freely therethrough when the plate 63a is disposed transversely of said tongue section so that when the latch dog 63 is rocked by the spring 67 to its inclined position of Figure 9 its opening 64 will bind around the tongue section 54 and any effort to move the tongue section 54 to the left and outwardly of the sleeve section 53 will merely increase this binding engagement to prevent extension of the tongue section 54. However, the tongue section 54 may be telescoped into the sleeve section 53 as an inward movement thereof will cause the latch dog 63 to swing clockwise as seen in Figure 9 toward an upright position and against the action of the spring 67. It will thus be seen that the friction latch dog 63 will function in the same manner as the latching dog 23 to permit the tongue section 54 to be telescoped into the sleeve 53 but to prevent it from being extended outwardly thereof except by manually engaging the exposed end of the lever 66 to swing the latch dog 63 to an upright position crosswise of the tongue section 54.

The outer end of the tongue section 54 is provided with a vertical clevis 68, corresponding to the clevis 34 and by which the tongue 52 may be coupled to a tractor, not shown, in the same manner as the tongue 12, as heretofore described. A stop unit, designated generally 69, is mounted on the tongue section 54 between the sleeve end 55 and clevis 68 and includes a collar 70 corresponding to the enlargement 60 which is slidably mounted on the tongue section 54 and which is provided with an opening 71 and slot 72, corresponding to the opening 61 and slot 62. A friction latch dog 73, corresponding to the friction latch dog 63, is associated with the collar 70 and forms a part of the adjustable stop 69. The plate 74 of the latch dog 73 is loosely mounted in the collar 70 and the tongue section 54 extends slidably through the opening 75 thereof when the plate is disposed at a right angle to said tongue section. A lug 76 of the latch dog 73 engages the opening 71 and the lever 77 is swingably disposed in the slot 72, in the same manner as previously described with reference to the lug 65 and lever 66. A expansion coiled spring 78 is mounted on the tongue section 54 within the collar 70 between the plate 74 and the end of the collar 70 located adjacent the clevis 68 and urges the latch dog 73 to swing clockwise as seen in Figure 9 to its inclined position as therein illustrated, opposite to the position of the latch dog 63 and in which position the tongue section 54 binds in the opening 75 so that the tongue section 54 is prevented from sliding through the stop 69 toward the sleeve 53 and the stop 69 is prevented from sliding on the tongue section 54 away from the sleeve 53 unless the lever 77 is engaged to swing the dog counterclockwise to an upright position against the action of the spring 78. However, the stop 69 may be slid toward the sleeve 53 since the dog 73 will thereby be displaced toward an upright position and out of gripping engagement with the tongue section 54 or said tongue section may be slid outwardly relatively to the stop 69 and away from the sleeve 53 in the same manner as if the stop is manually held.

It will thus be readily apparent that the friction latch dog 73 functions with the collar 70 in the same manner as the latch dog 38 functions with the collar 36. As the operation of the adjustable draft tongue 52 and its use corresponds to the operation and use of the draft tongue 12, previously described in detail, a further description of the purpose and function of the draft tongue 52 is considered unnecessary. It will likewise be readily apparent that a safety latch unit similar to the latch unit 44—51 could be employed with the draft tongue 52 for the same purpose as the safety latch unit previously described and it will also be apparent that the tongue sections 53 and 54 may be of any desired cross sectional shape.

Various other modifications and changes are contemplated and may obviously be resorted to, without departing from the spirit or scope of the invention as hereinafter defined by the appended claims.

I claim as my invention:

1. A draft tongue for connecting a draft vehicle and a trailer vehicle, comprising an elongated female tongue section, an elongated male tongue section telescopically fitting into the female tongue section and extending from one end thereof, a spring pressed one-way holding latch means connected to the female tongue section and engaging a portion of the male tongue section, disposed within the female tongue section, when in a latching position and releasably latching the male tongue section to prevent movement thereof relatively to the female tongue section toward an extended position, said latch means being disposed relative to the tongue sections to yieldably move toward a released position in response to a force tending to move the male tongue section toward a retracted position for permitting movement of said male tongue section inwardly of the female tongue section toward a retracted position and for latching the male tongue section in different retracted positions against return movement toward an extended position, said latch means being manually releasable for extending the male tongue section, and a stop mounted on the male tongue section between an outer end thereof and the adjacent end of the female tongue section for engaging said aforementioned adjacent end of the female tongue section to limit movement of the male tongue section toward a retracted position, said stop including a collar slidably mounted on the male tongue section and a spring pressed one-way holding latch means carried by said collar and engaging the male tongue section, said last-mentioned latch means being oppositely positioned relative to the first mentioned latch means to retain the stop against movement on the male tongue section away from the female tongue section and being yieldably releasable to permit the stop to slide on the male tongue section toward the female tongue section and to be re-latched automatically to the male tongue section in different positions of such movement.

2. A draft tongue as in claim 1, said last mentioned latch means comprising a friction latching dog having an opening disposed intermediate of its ends through which the male tongue section loosely extends, said latching dog having one end pivotally connected to a portion of the collar and an opposite end extending outwardly of the collar and swingably disposed relatively thereto, and the spring of said last mentioned latch means being disposed in the collar and engaging the latching dog for rocking the latching dog toward the female tongue section to cause the opening thereof to frictionally grip the male tongue section.

3. A draft tongue as in claim 1, said male tongue section having a series of ratchet teeth extending longitudinally thereof from adjacent its outer end and facing in a direction away from said outer end, and said last mentioned latch means comprising a pawl pivotally supported on said collar and having an end spring urged into engagement with said ratchet teeth.

4. A draft tongue as in claim 1, said female tongue section having an enlargement disposed near said aforementioned adjacent end thereof and in which the first mentioned latch means is disposed, said first mentioned latch means comprising a friction latching dog having an opening intermediate of its ends through which the male tongue section slidably extends, one end of said latching dog being pivotally connected to a portion of said enlargement and the opposite end thereof extending outwardly of the enlargement and being swingable relatively to the enlargement in a direction longitudinally of the draft tongue, and the spring of said first mentioned latch means being disposed in said enlargement and engaging the latching dog to swing the latching dog on its pivot toward said aforementioned end of the female tongue section to cause the opening thereof to bindingly engage with the male tongue section.

5. A draft tongue as in claim 1, said male tongue section having a series of ratchet teeth extending to adjacent the end thereof disposed within the female tongue section, said ratchet teeth facing toward said other remote end of the male tongue section, said first mentioned latch means comprising a pivotally mounted pawl disposed externally of and pivotally supported on the female tongue section, said pawl having an end extending into said female tongue section and spring biased into engagement with the ratchet teeth.

References Cited in the file of this patent
UNITED STATES PATENTS

| Number | Name | Date |
|---|---|---|
| 702,520 | Winterowd | June 17, 1902 |
| 1,273,063 | Huber | July 16, 1918 |
| 1,273,064 | Huber | July 16, 1918 |
| 2,446,223 | Forney | Aug. 3, 1948 |

FOREIGN PATENTS

| Number | Country | Date |
|---|---|---|
| 312,340 | Italy | Nov. 8, 1933 |